Feb. 19, 1963 R. V. WERNER ETAL 3,078,460
ELECTRONIC SURVEYING SYSTEM
Filed Sept. 2, 1958 2 Sheets-Sheet 1

FIG. 1

INVENTOR.
Robert V. Werner
Eddy Hose
BY Hugh L. Millis Jr.

_3,078,460_
ELECTRONIC SURVEYING SYSTEM
Robert V. Werner, La Mesa, and Eddy Hose, San Diego, Calif., assignors to Cubic Corporation, San Diego, Calif., a corporation of California
Filed Sept. 2, 1958, Ser. No. 758,469
20 Claims. (Cl. 343—12)

The present invention relates to an electronic surveying system, and more particularly, to an electronic system employing phase-comparison techniques capable of determining slant range between two points with a precision compatible with geodetic surveying requirements.

An electronic system for measuring the slant range between two displaced coacting instruments was described as a portion of the invention presented in a co-pending application for patent entitled "A Sequenced Spatial Coordinate Determining System" by R. V. Werner, W. J. Zable and W. J. Thompson, Serial Number 737,446, and filed on May 23, 1958. The system therein described was employed for tracking moving targets and for this purpose employed three of the slant range measuring units in order to acquire spatial coordinate tracking information. The slant range measuring technique employed was based on the physical principle that an electromagnetic wave propagated through space experiences a cumulative phase shift based on the total distance traveled. Thus, by comparing the phase shift between a signal transmitted from the ground and returned by the target vehicle, slant range to the target vehicle was obtained.

In that system, a number of so-termed range signals of increasingly longer wavelengths were simultaneously modulated on a carrier signal and the resulting phase shifts in these range signals measured. In the measurement, the shortest wavelength range signal determined the over-all system accuracy while each of the remaining signals were employed to resolve inherent ambiguities in the next shorter wavelength signal until the exact, unambiguous distance to the vehicle was determined. The average, over-all accuracy of the disclosed system was approximately five feet, and this accuracy limitation was based on the particular wavelength employed for the shortest wavelength range signal since, in general, the precision to which the phase difference between two signals can be measured, employing the best available electronic techniques, is essentially constant. Hence, the shorter the wavelength of the range signal, the greater the range precision measurement.

In particular, the shortest wavelength signal employed in the noted system had a frequency of approximately 500 kc. and represented the best compromise between I.-F. bandwidth requirements, system accuracy, and ease of electronic mechanization. In other words, if an attempt were made to employ a shorter wavelength signal, for the purpose of achieving greater system accuracy, serious electronic difficulties would soon ensue owing to the loss of I.-F. gain, increase of noise, system complexity, etc. Thus, in accordance with the techniques employed in the prior-disclosed system, the shortest wavelength range signal is limited in frequency to about one-half megacycle from practical electronic considerations, and this factor offered a basic, unalterable limitation in system accuracy.

The approximate five-foot accuracy obtainable by the noted system, although more than adequate for its specific application, is considerably less than geodetic surveying requirements, where accuracies on the order of a few inches rather than feet are mandatory. Although the present system employs the same principle of measuring phase shift between a transmitted and received signal, as does the prior-noted system, it achieves a remarkable improvement in accuracy by handling the range modulation signals in a totally different, ingenious, and unobvious manner.

In particular, two similar, interchangeable units are employed for performing the measuring function, and for each distance measurement one unit is delegated to act, by a front panel switch position, as a master station and the other as a slave. A minimum of five separate range readings must be taken, in a serial manner, at the master station to derive distance, ambiguity resolution, and other corrective information. Four of the readings are taken, one at a time, with the master station successively generating and transmitting range signal frequencies of 10.000 mc., 9.000 mc., 9.900 mc., and 9.990 mc., all appearing as modulation signals on a carrier signal frequency of approximately 9 kmc. For each of these readings, the slave station generates a carrier signal 48 megacycles higher than the received master station carrier signal, and, by coupling a portion of the transmitted signal in both master and slave stations back to their respective incoming received signals, an I.-F. signal of 48 mc. is generated and employed in both units.

The slave station produces a range signal exactly 1 kc. less than each of the noted master range signals and these slave-produced signals are modulated on the slave carrier signal for transmission back to the master. In addition, the 1-kc. signal employed in the slave station for creating its 1-kc. signal difference from the master range signal is also modulated on a separate carrier signal, of 70 kc., which is also transmitted to the master unit.

Now, the effect of mixing these two range signals, displaced by 1 kc., as modulated on respective frequency displaced carrier signals, in both of the master and slave I.-F. amplifiers, is to A-M modulate the I.-F. signal at the 1-kc. signal difference rate. The phase relationship between this A-M component in the master station I.-F. signal with the 1-kc. signal modulated at the slave on the 70-kc. signal, is a function of the distance between master and slave stations. Furthermore, this phase information is based not on the 1-kc. signal frequency, but on the actual frequency of the range signal, that is, 10.000 mc. Hence, by employing this method of handling the range signals, phase shift information inherent in the 10.000-mc. signal is transferred to the 1-kc. signal at the input of the I.-F. amplifier with the result that a narrow-band I.-F. amplifier may be employed, and extremely high accuracy information is obtainable.

In the master station, the phase difference between the two 1-kc. signals, that is, the A-M modulation component appearing on the I.-F. signal and the reference 1-kc. signal modulated on the 70-kc. signal, is measured and recorded as time differences for each of these previously-noted four range signal frequencies. Then, a final reading is taken in which the master station range signal frequency is set again at 10.000 mc., and the slave station return range signal frequency is higher by 1 kc., rather than the earlier 1-kc. lower frequency. The operation of the two stations is similar to the other range signal cases and the phase difference is again recorded.

A final data reduction process, which may be performed manually, is undertaken in which the five readings thus obtained are employed to determine the actual distance between master and slave stations. In particular, the 10.000 cm. range signal reading with the lower or $-1$-kc. slave return signal is subtracted from the corresponding reading taken with the higher or $+1$-kc. slave signal. As will be explained later in more detail, this subtraction operation effectively cancels out the phase delay incurred in the 1-kc. signal modulated on the 70-kc. signal in its travel from slave to master and, in addition, cancels out all major slave and master circuitry introduced phase delays.

In addition, the subtraction performed for the 9.000- mc., 9.900-mc. and 9.990-mc. range signal cases derives phase information corresponding to transmitted range signals of 1.000 mc., 100 kc. and 10 kc., respectively, or the difference between each of the range signals and the highly accurate 10.000-mc. signal. The resulting values are then manipulated to resolve ambiguities so that an unambiguous final time delay is obtained based on the actual master-slave distance. This time delay must then be corrected for the refractive index of air, and, to do this, readings should be taken at both master and slave stations of the atmospheric pressure, vapor pressure and temperature, and inserted in a correction formula. Finally, the distance between master and slave may be computed using the corrected time delay, and the most recently established value for light velocity in a vacuum, as may be obtained from any reference or handbook.

Multipath propagation effects, that is, phase errors caused by a portion of the transmitted carrier signal buoncing off of adjacent objects and intermixing with the direct path carrier signal may, in most instances, be eliminated by varying the master carrier signal in discrete steps and retaking the range reading for each different carrier signal frequency. The mean of the readings thus obtained will represent distance corrected for multipath effects.

Still another source of possible error, the accuracy and stability of the 10.000-mc. range signal, in turn, constituting the frequency reference or standard of the system may be minimized by reversing the functions of the master and slave stations and repeating the readings. In this way, two relatively independent sets of readings are obtained of the same distance and their average will represent an improvement in accuracy over that obtained by a single reading set. This is true since the averaging process will average out errors existing in the two reference 10.000-mc. oscillators, the circuitry producing the 1-kc. difference signal, and sources of minute errors.

The electronic distance-measuring system according to the present invention possesses several features which serve to enhance its general surveying utility. In the first place, owing to its master-slave convertability characteristics, it is possible to achieve, as noted above, increased accuracy over that which would be obtainable if separate master and slave units were independently employed. Also, this convertability characteristic offers a considerable increase in efficiency in large scale surveying operations where a plurality of units are simultaneously employed in the integrated surveying of a large area. In this application, a number of adjacent points may be readily tied together by employing each unit alternately as master and slave.

The employment of a precision resolver and null meter combination in the present system represents a combination which may be easily used by relatively untrained personnel, since only the resolver shaft need be rotated until a null reading is obtained, with a subsequent reading of the resolver shaft position. Also, since the present system, as will be described in more detail later employs a highly stable, oven-controlled crystal for generating its reference signal, no crystal calibration is required. This means, then, that no calibration data need be employed in the final data reduction step with the result that this portion of the surveying operation is simplified.

It is, accordingly, the principal object of the present invention to provide an electronic surveying system capable of measuring distance between two points to geodetic surveying accuracy requirements.

Another object of the present invention is to provide a pair of displaced electronic units capable of measuring phase shift in a range modulation signal transmitted therebetween to an accuracy which, when converted to distance, meets geodetic surveying requirements.

A further object of the present invention is to provide an electronic surveying system comprising a pair of identical electronic units, each of the units being selectively operable as master or slave and cooperatively capable when operated as respective master and slave, of determining distance information between their respective locations to a high precision.

A still further object of the present invention is to provide an electronic phase measuring system in which the phase information corresponding to distance in a relatively high frequency modulating signal is effectively transferred to a relatively low frequency signal whereby high accuracy distance information is obtained with only normal I.-F. bandwidth requirements.

Still another object of the present invention is to provide a pair of electronic units capable of measuring unambiguous distance between two points to geodetic surveying accuracy requirements by measurement of phase delay between each of a series of different wavelength signals transmitted and received between the units.

A further object of the present invention is to provide a pair of portable, manually-operable electronic surveying units capable of determining distance to high accuracy by measuring phase shift incurred in signals simultaneously transmitted and received between the units.

Another object of the present invention is to provide a pair of displaced electronic units in radio signal communication with each other and manually operable to selectively transmit and receive a series of range modulation signals whereby unambiguous distance information between the units is obtained by determining phase shift in each of the series of range signals.

A further object of the present invention is to provide a pair of spaced electronic units capable of measuring distance between two points to geodetic surveying accuracy requirements by selectively modulating the carrier signal produced by one of the units by a series of range signals of increasingly effective longer wavelengths and receiving and retransmitting the carrier signal received by the other unit but modulated by a series of range signals differing in frequency by a predetermined amount from the received series of range signals whereby phase difference between the transmitted and received series of signals at the first unit reperesents unambiguous distance between the units.

Still another object of the present invention is to provide a pair of manually operable electronic units in radio communication with one another capable of determining distance information between their respective locations to a high accuracy and additionally including a voice link so that their respective operators may communicate with each other.

A further object of the present invention is to provide a pair of spaced electronic units capable of measuring distance between two points to geodetic surveying accuracy requirements by modulating the carrier signal of a first carrier frequency produced by the first unit by a first range signal of a first range frequency, transmitting the modulated carrier signal to the second unit wherein the second unit retransmits the range signal but at a second range signal frequency on a carrier signal having a second carrier signal frequency whereby the retransmitted signal received at the first unit is mixed with the transmitted signal and the resulting I.-F. signal contains an amplitude modulation signal whose frequency corresponds to the difference between the first and second range signal frequencies and includes phase information corresponding to the distance between the two points.

Other objects, features and attendant advantages of the present invention will become more apparent to those skilled in the art as the following disclosure is set forth, including a detailed description of a preferred embodiment of the invention as illustrated in the accompanying sheets of drawings, in which:

Figure 1:
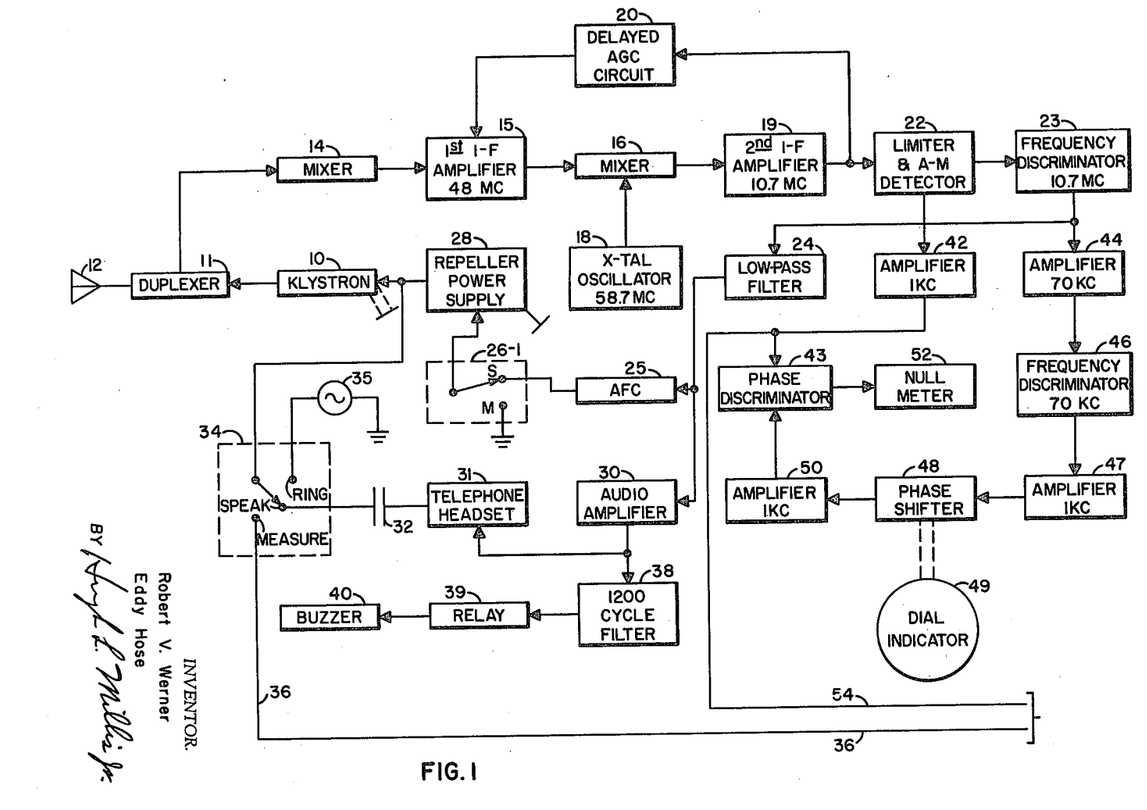
FIGURE 1 is a block diagrammatic representation of a first portion of a combined master-slave distance-measuring unit, in accordance with the present invention.

Referring now to the drawings wherein the same electronic units and components are given the same numerical designation, there are shown in FIGURE 1 the basic R.-F. and output sections of the combined master-slave unit of the electronic surveying system according to the present invention. As will be appreciated later, a single basic unit is shown since it, through a front panel switch position, may be selectively operated either as a master or a slave. Hence, the first part of the following detailed circuit description is based on the actual electrical connections employed in the combined unit without reference to either particular mode of operation. In particular, the output signal of a tunable klystron 10 is applied through a duplexer 11 to an antenna 12 for radiation as an outgoing electromagnetic wave. The incoming signal received at antenna 12 and representing the radiated signal of the other unit, regardless of whether the unit is operated as a master or slave, is coupled through duplexer 11 to the input terminal of a Mixer 14, whose output signal, in turn, is applied serially through a 48-megacycle 1st I.-F. amplifier 15 to one input terminal of a mixer 16. The output signal of a crystal-controlled 58.7-mc. oscillator 18 is applied to the other input terminal of mixer 16, and the mixer output signal is applied to a 10.7-megacycle 2nd I.-F. amplifier 19. A feedback loop, for constant gain purposes, is coupled between the output terminal of 2nd I.-F. amplifier 19 and the 1st I.-F. amplifier 15 through a delayed automatic gain control circuit 20.

The output signal of the 2nd I.-F. amplifier is also applied serially through a limiter and A-M detector 22 to a 10.7-megacycle frequency discriminator 23. The output signal from frequency discriminator 23 is coupled through a low-pass filter circuit 24 to an automatic frequency control unit 25, and from there to the slave contact point of a master-slave switch section 26-1. This slave contact point is indicated by an S, and the other or master fixed switch point is indicated by an M in this as well as other similar slave-master switch sections. The movable switch arm of section 26-1 is connected to a repeller power supply 28, whose output signal, in turn, is coupled to the input or repeller voltage terminal of klystron 10. The M contact point of switch section 26-1 is connected to ground, while the klystron input conductor is also coupled to the movable switch arm of a three-position operate switch 34.

The signal passing through low-pass filter 24 is also applied serially through an audio amplifier 30, a telephone headset 31, a condenser 32 to one of the fixed switch points of switch 34, designated "Speak." A source of alternating current potential, indicated at 35, and producing, for example, an alternating current signal of 1200 cycles, is connected between ground and another fixed contact point, designated "Ring," of switch 34. The output signal of audio amplifier 30 is also applied serially through a 1200-cycle filter 38 and a relay 39 to a buzzer, indicated at 40. Finally, the last or third fixed switch point of switch 34, designated "Measure," is connected to an output conductor 36 which is connected to the remaining portion of the electronic distance-measuring system as shown in FIGURE 2 and described in connection therewith.

The final portion of FIGURE 1 is the output section which employs the output signals from detector 22 and discriminator 23. In particular, the A-M signal coming from the A-M detector portion of detector 22 is coupled through a 1-kc. amplifier 42 to the input terminal of a phase discriminator 43. An output conductor 54, which is coupled into the FIGURE 2 circuitry is also connected to the input conductor of discriminator 43.

The signal from frequency discriminator 23 is coupled serially through a 70-kc. amplifier 44, a 70-kc. frequency discriminator 46, a 1-kc. amplifier 47, a phase shifter 48, a 1-kc. amplifier 50 to the other input terminal of phase discriminator 43. Phase shifter 48 may comprise, for example, a resolver whose shaft is adapted to be manually rotated, and is associated with a calibrated dial indicator, shown at 49, having a scale for indicating the shaft position of the phase shifter. Finally, the output signal of phase discriminator 43 is applied to a null meter 52.

Figure 2:
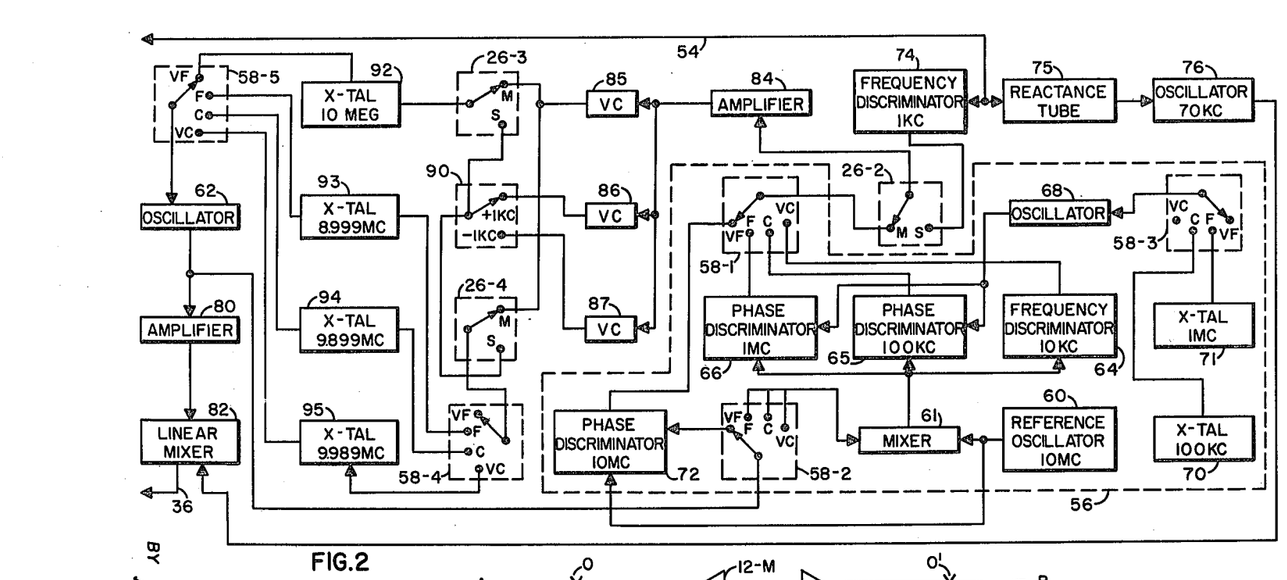
FIGURE 2 is a block diagrammatic representation of the final portion of a combined master or slave distance-measuring unit, in accordance with the present invention.

Referring now to FIGURE 2, there is shown in block diagrammatic form, the remaining portion of the distance-measuring system of the present invention. The master station modulation signal generator is formed by the circuitry enclosed within the dotted line 56. This modulation signal generator includes a 10-megacycle reference oscillator 60 whose output signal is applied to one input terminal of a mixer 61 and to the input terminal of a 10-megacycle phase discriminator 72. The other input terminal of mixer 61 receives the output signal of a final oscillator 62, external from generator 56, which, as will be later shown, furnishes the modulating signal for klystron 10 in FIGURE 1.

The output signal of mixer 61 is applied to the input terminal of a 10-kc. frequency discriminator 64 and to one input terminal of each of 100-kc. and 1-mc. phase discriminators 65 and 66, respectively. The other input terminals of phase discriminators 65 and 66 are coupled to the output terminal of an oscillator 68, whose input terminal, in turn, is coupled to the movable arm of a four-position modulation channel switch 58-3. In particular, the output terminal of a 100-kc. crystal 70 is coupled to the Coarse channel contact point, indicated at C of section 58-3, while the output terminal of a 1-mc. crystal 71 is coupled to the Fine channel switch contact point, indicated at F. The output signals of frequency discriminator 64 and phase discriminators 65, 66, and 72 are applied to the Very Coarse, Coarse, Fine and Very Fine fixed switch points, respectively, and are respectively designated as VC, C, F and VF of another channel selector switch section 58-1. The movable arm of section 58-1 is connected to the master or M fixed contact point of another master-slave switch section 26-2.

The output line 54 coming from amplifier 42 as shown earlier in FIGURE 1, is connected to the input terminals of a 1-kc. frequency discriminator 74 and a reactance tube 75. The output signal of frequency discriminator 74 is applied to the S contact point of the earlier noted master-slave switch section 26-2. The output signal of reactance tube 75 is applied to a 70-kc. oscillator 76 whose output signal, in turn, goes to one input terminal of a linear mixer 82. The other input terminal of mixer 82 receives the output signal of final oscillator 62 after appropriate amplification by an amplifier 80. The output line from mixer 82 constitutes line 36, formerly shown in FIGURE 1, which is connected to the "Measure" contact point of operation selector switch 34.

The remaining portion of the circuitry to be described deals primarily with the generation of the modulation signals when the unit is operated as a slave. In particular, the movable switch arm of switch section 26-2 is coupled to the input terminal of an amplifier 84, whose output signal is applied to the input terminals of each of three voltage sensitive capacitor elements 85, 86 and 87. The output terminal of capacitor 85 is connected to the respective M switch contact points of a pair of master-slave switch sections 26-3 and 26-4. The output signals of capacitors 86 and 87 are coupled to the respective +1-kc. and −1-kc. fixed contact points of a two-position switch indicated at 90. The movable arm of switch 90 is connected to the S contact point of each of switch sections 26-3 and 26-4.

The movable switch arm of switch section 26-3 is coupled through a 10-megacycle crystal 92 to the Very Fine or VF switch contact point of another channel selector switch section 58–5. The movable switch arm of master-slave selection switch section 26–4 is connected to the movable arm of another modulation channel selection switch section 58–4. The F or Fine channel contact point of section 58–4 is applied through an 8.999-mc. crystal 93 to the F or Fine fixed contact point in switch section 58–5. In the same way, the C or Coarse contact point and the VC or Very Coarse contact point of section 58–4 are applied through a 9.899-mc. crystal 94 and a 9.989-mc. crystal 95, respectively, to the C and VC contact points, respectively, of section 58–5. Finally, the input terminal of previously-described oscillator 62 is connected to the movable arm of section 58–5.

In considering the detailed operation of the electronic distance-measuring system according to the present invention, it will be appreciated that two complete, spaced units are required for making a distance measurement. The front panels of the two units will, of course, be identical and, although not shown in detail, will contain four major front panel switches. These will include a master-slave or M-S switch as represented in the detailed drawings by the switch sections numerically designated by 26. Also included are a modulation signal or channel selector switch, indicated by the switch sections designated 58, a +1-kc. and −1-kc. switch indicated in FIGURE 2 by switch 90, and finally an operation switch as represented at 34. Other minor switches such as a power switch, etc., will be employed in addition to these major switches.

The M-S switch of the particular unit to act as the master unit will be thrown to the M switch position while the corresponding switch in the other unit will be thrown to the S position, with the result that the two will operate together as respective master and slave units. With these respective switch positions, the repeller power supply terminal of the master station will be grounded through switcch section 26–1 and, as a result, klystron 10 will produce a carrier signal having a center frequency of approximately 9 kilomegacycles. On the other hand, the repeller power supply input terminal in the slave station will be coupled to an automatic frequency control loop and its output voltage controlled thereby so as to maintain its klystron carrier signal center frequency at a 48-mc. higher frequency value than the master station signal, or at 9048 mc. Assuming now that the slave's klystron is operating at a 48-mc. higher frequency than the carrier signal produced by the master station, then the mixture of the two carrier signals in mixer 14 from duplexer 11 will produce the I.-F. amplifier signal of 48 mc. This will happen in both master and slave stations. This first I.-F. signal, in turn, is stepped down to a second I.-F. signal frequency of 10.7 mc. by being mixed by mixer 16 with the 58.7-mc. output signal frequency of crystal-controlled oscillator 18.

Any frequency drifts in the second I.-F. signal will appear as a D.-C. signal level in the output signal of frequency discriminator 23 and will be of plus or minus polarity, depending upon the direction of its frequency drift away from the stated 10.7 mc. This discriminator output signal, in turn, is filtered by low-pass filter 24 to filter out the 70-kc. frequency modulation component and this filtered D.-C. signal is amplified by automatic frequency control amplifier 25 for application through switch 26–1 to repeller power supply 28. The polarity relationships between the input signal to afc circuit 25, power supply 28, and the klystron output signal frequency, are such as to maintain the stated klystron carrier signal frequency, with any deviations therefrom being automatically corrected.

As noted earlier, a human operator is required at each of the master and slave stations and one of their duties in determining the exact distance between the two stations is taking a series of range measurements employing the equipment. In order to facilitate the taking of these measurements and correlating other data and information, a radio-communication link is provided in the present system between the master and slave stations which enables either operator to attract the attention of the other, at which time the two may converse with each other. This is accomplished by properly manipulating operation switch 34. Assume, for example, that one operator desires to communicate with the other. To do this, the operation switch arm in the front panel of his unit is thrown to contact the "ring" connection. In this position, the 1200-cycle signal generated by source 35 is applied to the klystron input terminal to accordingly frequency modulate its output signal. This component in the transmitted signal will, in turn, be received at the antenna of the other station, passed through the first and second I.-F. stages, detected by frequency discriminator 23, passed through low-pass filter 24, amplified by audio amplifier 30 and passed by 1200-cycle pass filter 38 to a relay shown in block schematic form at 39. The relay will be activated by the signal received from filter 38 to apply energizing current to a buzzer shown in block form at 40. The resulting sound will attract the attention of the operator at the other station. It will be seen that the position of the operation switch 34 in the station receiving the "ring" signal will be immaterial since the ringing signal by-passes this switch.

After the attention of the operator at the other station has been attracted, the operation switch at both stations may be thrown to the "speak" contact position, at which time two-way verbal communication may be held between the operators through employment of their respective telephone headsets. The headset, shown in block diagrammatic form in FIGURE 1, will actually contain two portions, as will be appreciated, an earphone and a microphone. The earphone portion is connected to the audio amplifier output terminal while the microphone is connected through capacitor 32 to the operation switch. Speech into the microphone will be frequency-modulated on the klystron 10 output signal in the way previously explained for the A.-C. signal from source 35 for the "ring" operation. This speech modulated signal will then be transmitted through the antenna to the other station and appear as the output signal of the audio amplifier which, in turn, will be fed into the earphone portion of the headset. Hence, both operators may converse with each other in the manner normally done over conventional telephone lines.

Before viewing in more detail the actual operation of the remaining portion of the circuitry as it is selectively employed either as master or slave, it is desirable to consider in a general manner certain of the theoretical aspects upon which its operation is based. The physical principle upon which the present electronic distance-measuring system is based is that an electromagnetic wave, propagated through the atmosphere, experiences a cumulative phase shift which repeats cyclically as it travels through the atmosphere. The phase shift produced after traveling a predetermined distance is exactly proportional to the distance traveled, assuming the wave to move at a known finite velocity, and to the wavelength of the propagating signal frequency. For example, a 10-megacycle signal will experience one cycle or 360 degrees of phase shift for approximately every 50 feet of travel through the atmosphere.

This physical principle is utilized by the present system in that the klystron carrier signal in the master station is, for a first range measurement, modulated by a 10-megacycle signal and the phase delay incurred in its travel between the master and slave stations is effectively measured, although not, as will be later seen, directly. Now, as noted above, a 10-megacycle signal experiences a phase delay of one cycle, or 360 degrees, for approximately every 50 feet of travel. The distance information thus obtained will exhibit two major characteristics. In the first place, the distance represented by the measurable phase shift will be highly accurate, down to a few inches, since, in general, the accuracy to which signal phase shift measurements may be made is a function, approximately one part in several thousand, of the wavelength of the signal being measured. However, secondly, the distance information thus obtained will be ambiguous, that is, the measurement will represent some fraction or portion of 50 feet and the total number of complete cycles made in its travel, which, of course, is needed to obtain the total distance, will not be known.

In order to resolves the ambiguity in this 10-megacycle carrier, and thereby enable its superior accuracy characteristics to be employed by the system in achieving ultimate measurement accuracy, it is necessary to employ carrier signal frequencies of progressively lower frequencies. Each of the successively lower frequency signals serves to resolve the ambiguities of the next higher frequency, with the lowest signal frequency being so chosen that its wavelength is sufficiently long to resolve the maximum distance intended to be employed between the slave and master units in meeting the anticipated surveying requirements. In particular, four of such signal frequencies are employed by the present system in making distance measurement, these signals being of 10 mc., 1 mc., 100 kc., and 10 kc., the latter yielding an unambiguous range of approximately 10 miles.

The apparently obvious manner of employing these signals would be to have them successively modulate the klystron carrier signal and take each resulting range reading. Then, a data reduction step would be performed to resolve the range measurement ambiguities and achieve a final range measurement within the specified system accuracy.

Although a modulation technique of the type described would appear to be the obvious approach to take, one insurmountable problem would arise, as based on practical electronic considerations. In particular, modulation signals of 10 mc. and 1 mc. would require excessive receiver I.-F. bandwidths, and present electronic techniques are incapable of meeting problems connected with noise, low gain, circuit complexity, etc., associated with such requirements. Additionally, other disadvantages would occur, even if the I.-F. bandwidth requirements could be electronically met. In the first place, owing to the amount of separation between adjacent frequencies, a separate oscillator circuit would be required for producing each signal. Also, for reasons to be later shown, two separate measurements would have to be taken for each modulation signal in order to compensate for, and hence eliminate, certain fixed phase delays incurred in each modulating signal as it passed through the internal electronic circuitry.

In order to ease the I.-F. bandwidth requirements, eliminate the need for four separate oscillators and the taking of two readings for each modulation signal, the present system employs a different, unobvious, and novel modulation scheme. In particular, and ignoring the I.-F. bandwidth point for the time being, a single output oscillator is employed. This oscillator is then operated at exactly 10.000 megacycles for modulating the klystron output signal for producing the stated 10-megacycle range signal. Then, it is operated at 1.000 megacycles less than 10.000 mc., or at 9.000 mc., for achieving an, as termed, effective 1-mc. range signal. Similarly, it is operated at 100 kc. less than 10.000 mc., or at 9.900 mc., for the effective 100-kc. signal, and at 9.990 mc. for the effective 10-kc. signal. The ranging information determined from the series of readings taken at the 10.000-mc., 9.000-, 9.900- and 9.990-mc. is then, in a final data reduction process, transformed to exact 1.000-megacycle, 100-kc. and 10-kc. range data by subtracting the 9.000-mc. reading from the 10.000-mc. reading to acquire 1.000-mc. data, the 9.900-megacycle reading from the 10.000-mc. reading to acquire 100-kc. range information, and finally, the 9.990-mc. from the 10.000-mc. reading to acquire 100-kc. range information, and finally the 9.990-mc. from the 10.000-mc. reading to acquire 10-kc. range data.

Having considered the general procedure employed in taking distance measurements by the present system, consider now, some more detailed aspects of its operation, and, first, consider the detailed circuitry in the master station range signal generator unit 56 of FIGURE 2 employed in the master station operation for generating the stated four ranging signals. Assume, first of all, that the channel selector switch 58 is thrown to its Very Fine or VF channel position and, with this switch connection made, the output signal of the highly-stabilized crystal-controlled reference oscillator 60, of 10.000 mc., is applied to phase discriminator 72, as is the singal of output oscillator 62, through the movable switch arm of switch section 58–2. Reference oscillator 60, it should be here stated, is preferably oven-stabilized in accordance with the best practice in the crystal art, since, as will become clear later, its long-term frequency stability is one important factor in achieving over-all system accuracy.

The polarity and magnitude of the output D.-C. signal from discriminator 72 will represent the frequency offset, in direction and amount, of the oscillator 62 output signal deviation from the standard 10.000-mc. frequency, as produced by reference oscillator 60. This D.-C. error signal is passed through switch sections 58–1 and 26–2 to amplifier 84 and the amplified error signal is applied to the input terminal of voltage-sensitive capacitor element 85. This element, including the other voltage-sensitive capacitor elements may, for example, comprise a crystal diode whose capacitance is a function of an applied potential. Such an element is marketed under the trade name of Varicap as manufactured by Pacific Semiconductors, Inc. Alternately, the voltage-sensitive capacitor element may include any one of the well-known barium titanate, or similar non-linear capacitor types, whose capacitance value is likewise a function of an applied D.-C. voltage.

Now, the capacitance of variable capacitor 85 appears in the input circuit, along with 10-megacycle crystal 92, of osicllator 62, through the appropriate connections of switch sections 26–3 and 58–5 and its reactance value, together with the crystal reactance value, will determine the output signal frequency of oscillator 62. In particular, its capacitance will be varied by the applied potential from amplifier 84 until the output signal frequency of oscillator 62 matches that produced by reference oscillator 60, or 10.000-mc. This correspondence will occur at a null condition, that is, when the output signal of phase discriminator 72 is substantially at zero magnitude.

Continuing the description of operation of signal generator unit 56, consider now its operation when the channel selector switch is thrown to its F contact position. In this switch position, 1-mc. crystal 71 causes oscillator 68 to oscillate at 1 megacycle, which is applied to 1-mc. phase discriminator 66 along with the output signal of mixer 61. The output signal of mixer 61 will be at the difference frequency between the 10-mc. and 9-mc. output frequencies of oscillators 60 and 62, respectively, or 1-mc. in frequency.

Any deviation from the assumed 9-mc. output frequency of oscillator 68 will be reflected as a variation in the 1-mc. output frequency of mixer 61, and as a result, a D.-C. signal will appear on the output terminal of phase discriminator 66, reflecting the degree of its input signal change. This D.-C. signal will be conducted through switch sections 58–1 and 26–2 to amplifier 84 and the amplifier signal will again act to vary the capacitance of voltage-sensitive capacitor element 85. In the F switch contact position, element 85 will control the tuning of 8.999-megacycle crystal 93 and raise the combined tuning value, as presented to oscillator 62, to the desired 9.000-mc. value. Accordingly, oscillator 62 will oscillate at 9.000 megacycles and, as before, any deviations therefrom will be corrected through feedback action.

The generation of the 9.900-megacycle signal for the Coarse range measurement is quite similar to that described for the Fine range signal except that, for this switch position, 100-kc. crystal 70 excites oscillator 68 at its 100-kc. rate, and this signal is applied to one input terminal of 100-kc. phase discriminator 65. Oscillator 62 is driven in this channel switch position by 9.899-mc. crystal 94 whose tuning is raised to the 9.900-mc. point by action of voltage-sensitive capacitor 85, in turn driven by feedback voltage derived originally from discriminator 65.

Finally, the 9.990-megacycle range signal is generated in a slightly different manner than the previous range signals primarily since its accuracy and stability requirements, as will be later shown, are somewhat reduced in comparison to the other range signals. Thus, the output signal of mixer 61, containing the difference frequency between reference oscillator 60 and output oscillator 62 is applied through 10-kc. frequency discriminator 64, and the D.-C. output level from this discriminator is employed through element 85 for raising the normal 9.989-mc. tuning of crystal 95, and hence the output signal frequency of oscillator 62, to 9.990-mc.

The output signal of oscillator 62, for all positions of channel selector switch 58, is amplified and passed, by itself, through linear mixer 82. This is true since switch section 26-2 effectively uncouples reactance tube 75 and oscillator 76 from the other mixer input terminal when in the master contact position. The output lead 36 of mixer 82 is connected in FIGURE 1 to the "measure" contact point of operation switch 34, hence the output range signal of oscillator 62 will act to frequency modulate the output signal of klystron 10 for transmission over antenna 12 to the slave unit.

In describing the combined operation of the slave and master stations, assume that channel selector switch 58 is thrown to the same contact point in both the master and slave stations with the result that one of the four modulation signals is transmitted by the master and received at the slave. Now, duplexer 11 is arranged in both master and slave units to provide a predetermined amount of coupling between its input and output sections with the result that the incoming and outgoing signals in both units are linearly combined and their mixture applied to mixer 14. Also, the klystron in the slave station, as described previously, is servoed by an included AFC loop to operate at a 48-mc. higher carrier signal frequency than the incoming master station signal. Hence, first I.F. amplifier 15 in both master and slave units will operate on the frequency difference between the two transmitted signal frequencies, or 48 mc.

In a manner to be described shortly, the slave unit effectively demodulates the transmitted range signal and then creates a similar modulation signal which differs by 1 kc. from the frequency of the master range signal. In particular, the slave generated range signal may be 1 kc. higher or lower than the incoming signal, as determined by the particular contact position of the +1-kc. and —1-kc. switch section 90. This slave created modulation signal is then modulated on its klystron carrier signal for retransmission to the master. As will also be later explained, the slave station also generates a 70-kc. signal which is frequency modulated by the 1-kc. signal frequency difference between the master and slave range signals. The resulting FM modulated 70-kc. signal also frequency-modulates the klystron output signal for transmission to the master.

Owing to the input-output coupling present in each duplexer, both of the 1-kc. differing master and slave range modulation signals, and the 70-kc. signal generated in the slave unit, will be applied to the I.F. amplifiers in both stations. Now, a rather unexpected result is obtained from such a mixture, as may be shown by an elaborate mathematical derivation lying considerably outside the scope of the present treatment. In particular, it may be shown that if a pair of carrier signals, $f_{c1}$ and $f_{c2}$, are frequency modulated by a pair of modulation signals, $f_{m1}$ and $f_{m2}$, respectively, and are mixed in an I.-F. amplifier operating at a frequency equal to $f_{c1}-f_{c2}$, then the I.-F. signal will be amplitude-modulated by a signal equal to $f_{m1}-f_{m2}$, the modulation signal difference. Thus, in the present case, since the master and slave carrier signals differ by 48 mc., the I.-F. frequency, the A-M modulation signal appearing on the I.-F. signal will be 1 kc., or the frequency difference between the two range signals. Another result obtained is that the phase information contained in the original 10-mc. range signal has been effectively transferred to the 1-kc. signal. Accordingly, this information is readily handled by the I.-F. amplifier without any of the previously noted difficulties associated with a 10-mc. I.-F. signal.

In particular, the phase difference between the 1-kc. A-M signal and the 1-kc. signal frequency-modulated on the 70-kc. signal, as they appear in the master station's I.-F. signal, includes a component representing the distance traveled between slave and master. As will be later shown by an elementary mathematical analysis, the phase difference between these two 1-kc. signals also includes various master and slave circuitry phase shifts in addition to the desired distance information. The manner of separating the desired distance from circuit phase information forms an important aspect of the present invention and will be later explained in more detail.

Consider now the detailed operation of the slave unit in response to receiving, for example, the 10-megacycle or VF range signal from the master station, as generated in the previously described manner. Assume, first of all, that the switch arm of switch 90 is thrown to its —1-kc. contact position and further assume that output oscillator 62 in the slave station is producing a 9.999-megacycle range signal, or 1-kc. lower in frequency than the incoming master station range signal. This signal will cause, as noted previously, a 1-kc. amplitude modulation on the 48-megacycle I.-F. signal. This A-M signal will, in FIGURE 1, be detected by limiter and A-M detector 22 and, after amplification, applied over conductor 54 to the respective input terminals of frequency discriminator 74 and reactance tube 75, in FIGURE 2. The D.-C. signal output of discriminator 74, representing the frequency offset, if any, from its stated 1000-cycle input signal, is amplified by amplifier 84 and applied to voltage-sensitive capacitor 87, whose capacitance value, in turn, appears with crystal 92 in the input circuit of output oscillator 62 and hence determines its frequency operating point.

The servo loop, thus arranged, controls the capacitance value of element 87 such that the resonance point of it in combination with crystal 92, lowers the operating signal frequency of oscillator 62 to 69.999 mc. Any deviations therefrom will be corrected through action of the discriminator 74 signal being applied to voltage-sensitive capacitive element 87 after amplification by amplifier 84.

The 1-kc. signal produced by the A-M detector in the slave station changes the reactance of reactance tube 75, in FIGURE 2, and this changing reactance, in the well-known manner, frequency-modulates the normal 70-kc. center frequency signal produced by oscillator 76. This frequency-modulated 70-kc. signal is combined with the output signal from final oscillator 62 in linear mixer 82 and the two, in turn, frequency-modulate klystron tube 10, in FIGURE 1, through the "measure" contact point of switch 34.

In the master station, the 10.7-mc. discriminator 23 will detect the F-M signal coming from the slave station and appearing in its I.-F. signal. Then, 70-kc. frequency discriminator 46 will detect the 70-kc. signal and produce, as its output signal, the 1-kc. signal originally employed in the slave to frequency-modulate the 70-kc. signal. This detected 1-kc. signal, after amplification by amplifier 47, is passed through phase shifter 48 which may, for example, be a conventional type of resolver connected as a linear phase shifter.

As will be appreciated by those skilled in the art, this may be accomplished by serially connecting a resistor and capacitor across two of its rotor windings and mutually connecting the other ends of its rotor winding to ground. Then, the value of the capacitor is chosen such that its capacitance reactance, $X_c$, at the applied signal frequency of 1000 cycles, equals the value of the resistor. With these parameters established, the input signal to the resolver, applied to the resistor and capacitor common junction, will be transferred to an output stator winding with a phase shift which is a linear function of the shaft displacement. That is, a 1-degree change of shaft displacement will provide a 1-degree phase shift change in the signal passing through the resolver. Dial indicator 49 includes a knob connected to the resolver rotor shaft in order that the shaft may be readily rotated by the master station operator. A fixed scale may be provided adjacent the knob by which the position of the resolver shaft may be determined, and, in particular, the scale may be marked off in units of time, representing phase shift, from which distance measurements may be later computed.

Now, the 1-kc. signal passing through amplifier 42, representing the I.-F. amplitude modulation signal, is applied to one input of phase discriminator 43 while the detected 1-kc. signal from discriminator 46, appearing originally on the 70-kc. signal, is applied to the other input terminal of discriminator 43 after undergoing a phase shift through phase shifter 48. The output signal from discriminator 43 is applied to null meter 52, of conventional type, which indicates, through its pointer position, the presence or absence of an applied signal. The distance measurement readings are taken only at the master station and each reading is taken by manually rotating dial indicator 49 until a zero or null reading is obtained on null meter 52. This signifies that the phase shift of the two signals applied to phase discriminator 43 are at quadrature, or 90° apart. This will only be the case when the phase shift provided the 1-kc. signal from discriminator 46 by phase shifter 48 differs by exactly 90° in phase from the other incoming 1-kc. signal. Hence, the position of the phase shifter shaft corresponds to this phase shift.

The next reading in the required series may be performed by leaving the master station channel selector switch on the Very Fine contact position and changing the position of switch 90 in the slave station from its −1-kc. to its +1-kc. terminal position. This acts, as may be seen by tracing the involved circuitry, to substitute voltage-sensitive capacitor element 86 for switch element 87 in controlling the frequency, with crystal 92, of oscillator 62. In particular, the value of capacitor element 82 is such as to raise the crystal 92 resonant point to 1 kc. above 10 megacycles, or 10.001 mc., as contrasted with 9.999 mc. for the −1-kc. position. Accordingly, oscillator 62 in the slave station will be driven to oscillate at 10.001 megacycles in the manner previously described. The operation of the master station for this reading will be exactly similar to the case described for the −1-kc. slave switch position, there being no different switch positions nor changes in operating signal frequencies.

The reason for taking a pair of readings on the Very Fine channel setting will later be explained in connection with an associated mathematical derivation. In brief, by subtracting the two readings obtained, phase delay errors caused by circuitry are cancelled, the phase shift undergone by the slave-generated 1-kc. signal as frequency-modulated on the 70-kc. signal is eliminated, and the remaining phase shift reading is based on the distance actually traveled by the range signal in going from slave to master stations.

The next reading is taken by throwing the channel selector switch 58 in both master and slave stations to the F or Fine channel position, throwing the switch 90 arm back to the −1-kc. position and repeating the prior described measurement. The operation of the master station circuitry in generating the 9.000-megacycle range signal has been previously described. In the slave station, 8.999-megacycle crystal 93 is connected through switch sections 58-4 and 26-4 and the −1-kc. switch point of switch 90 to the voltage-controlled variable capacitive element 87 and is servoed through the previously described feedback action to maintain the output signal of oscillator 62 at 8.999 megacycles or 1 kc. less than the incoming master signal. The operator at the master station rotates dial indicator 49 until null meter 52 reads zero, and records the corresponding scale reading. No reading need be taken for the +1-kc. contact position of switch 90, since, as will be later demonstrated, the +1-kc. information acquired during the VF channel measurements is sufficient, during a final data reduction or calculation stage, for cancelling out the circuit phase delays, etc., found in this and the remaining channel readings.

The final two readings for the Coarse and Very Coarse channels are made one after the other, and, in the manner previously described, the master station produces an output modulation signal of 9.900 megacycles for the Coarse reading. In this channel switch setting, the slave station feedback loop is coupled to the capacitor element 87 and crystal 94 combination, which act to drive oscillator 62 at 9.899 megacycles, or 1 kc. less than the incoming range signal. Similarly, in the Very Coarse channel setting, the slave station employs element 87 and crystal 95 to drive oscillator 62 at 9.989 megacycles, which again is 1 kc. less than the master generated range signal of 9.990 mc.

Figure 3:
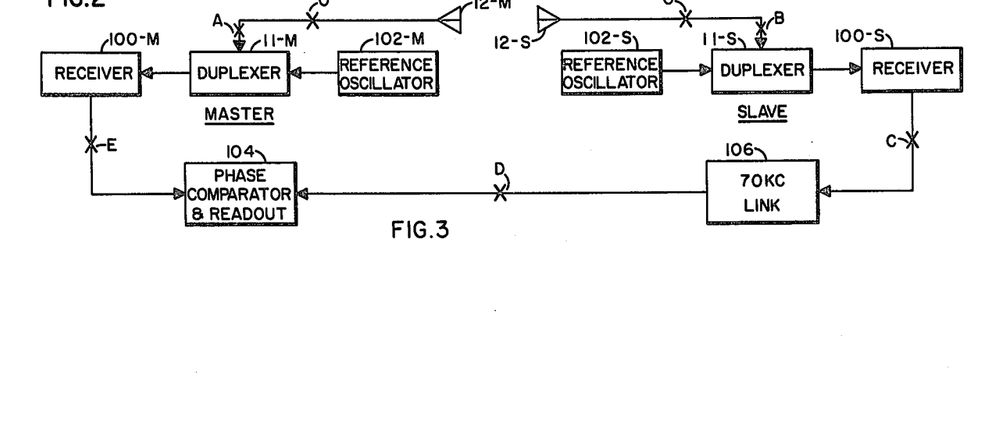
FIGURE 3 is a block schematic representation of a pair of master and slave units in joint operation for the purpose of illustrating circuit phase error cancellation techniques in accordance with the present invention.

Reference is now made to FIGURE 3, in which the present system is shown in a greatly simplified block diagram form for illustrating the techniques employed in reducing the readings obtained to determine actual distance between the units by cancelling out circuit introduced phase delays. These circuit phase delays would normally, as will be appreciated, be inseparable from the phase delays introduced by the actual distance traveled by the propagated and received signals.

In particular, in the figure, the master and slave antennas are designated by 12–M and 12–S, respectively, while their respective duplexers are at 11–M and 11–S. The master's receiver portion of the circuitry is blocked in at 100–M, while the corresponding receiving circuitry of the slave station is shown at 100–S. In the same way, the reference oscillator section of the master station is shown at 102–M, while the slave oscillator portion is indicated at 102–S. The phase comparator readout portion of the master station is indicated at 104, and the entire communication link from slave to master from its originating to readout point of the 1-kc. frequency modulated 70-kc. signal, is represented by box 106. This 70-kc. link is taken to represent all phase delays incurred by it both in the circuitry of the two stations and in its travel between the two antennas.

A number of X marks are placed in the figure, and are given alphabetical designations. The phase delays incurred by the signals in traveling between the designated points are listed below, as referenced to the marks.

Let:

The time delay from point A to point O be $T_0$;
The time delay from point O to point O' be $T_r$;
The time delay from point O' to point B be $T_{0'}$.
The time delay from point B to point C be $T_1$;
The time delay from point C to point D be $T_2$;
The time delay from point E to point A be $T_3$; and let $T_{d1}$ be the instantaneous time delay between the slave and the master reference oscillators as measured at their respective duplexers. This term is present since there can be no phase lock between the master and slave range signals, owing to their frequency difference.

For simplifying the considerations involved, only modulation frequencies are considered in the following mathematical treatment, since the carrier signal frequencies have no bearing or effect on the final results. It is also assumed that all of the designated delays remain constant during the time required to take a complete set of slave-master readings. Further, for simplification, terms having the form $E \cos(\omega_1(t+\tau_1)+\omega_2\tau_2)$ are represented by $(\omega_1(t+\tau_1)+\omega_2\tau_2)$.

Also, point A, the master station duplexer input point, is used in this designation as the time base reference for the whole system. This, as will be appreciated, is a matter of convenience since any other point could have just as well been chosen for this purpose.

*Case I.*—The VF reading obtained when switch 90 is thrown to its −1-kc. terminal in the slave:

Under this condition, master transmits $\omega_1$ or 10.000 mc. and the slave transmits $\omega_1-\omega_0$, or 9.999 mc., $\omega_0$ being equal to 1 kc.

(1) The signals present at point A are:

$$\omega_1 t \text{ and } (\omega_1-\omega_0)(t-T_{d_1}-T_0-T_{0'}-T_r)$$

(2) The signals present at point E as a result of mixing and amplifying the point A signals through the receiver:

$$\omega_0(t-T_{d_1}-T_0-T_{0'}-T_r-T_3)+\omega_1(T_{d_1}+T_0+T_{0'}+T_r)$$

It will be observed that the second term in the expression, multiplied by $\omega_1$, represents phase and not signal information.

(3) The signals present at point B in the slave:

$$\omega_1(t-T_0-T_{0'}-T_r) \text{ and } (\omega_1-\omega_0)(t-T_{d_1})$$

(4) The signals present at point C as a result of mixing and amplification in the slave receiver:

$$\omega_0(t-T_{d_1}-T_1)+\omega_1(T_{d_1}-T_0-T_{0'}-T_r)$$

As in (3), the second or $\omega_1$ term represents phase information only.

(5) The signals present at readout point D after transmission from point C. The 70 kc. subcarrier signal disappears in the detecting processes.

$$\omega_0(t-T_{d_1}-T_1-T_2)+\omega_1(T_{d_1}-T_0-T_{0'}-T_r)$$

(6) The phase angle presented by the readout, obtained by taking the phase difference between the point E and D signals, is:

$$\omega_0(T_1+T_2-T_0-T_{0'}-T_r-T_3)+2\omega_1(T_0+T_{0'}+T_r)$$

This expression represents the phase information actually measured and recorded at the master station, and includes, as noted previously, circuitry phase shifts and the 70-kc. link phase shift intermixed with the desired distance information phase shift, $T_r$.

*Case II.*—The VF channel reading obtained when switch 90 is thrown to its +1-kc. position.

Under this situation, the master still transmits $\omega_1$ and the slave $\omega_1+\omega_0$.

(7) Signals present at point A;

$$\omega_1 t \text{ and } (\omega_1+\omega_0)(t-T_{d_2}-T_0-T_{0'}-T_r)$$

(8) Signals present at point E;

$$\omega_0(t-T_{d_2}-T_0-T_{0'}-T_r-T_3)+\omega_1(-T_{d_2}-T_0-T_{0'}-T_r)$$

(9) Signals present at point B;

$$\omega_1(t-T_0-T_{0'}-T_r) \text{ and } (\omega_1+\omega_0)(t-T_{d_2})$$

(10) Signals present at point D;

$$\omega_0(t-T_{d_2}-T_1-T_2)+\omega_1(-T_{d_2}+T_0+T_{0'}+T_r)$$

(11) Output reading, or phase E minus phase D;

$$\omega_0(T_1+T_2-T_0-T_{0'}-T_r-T_3)+2\omega_1(-T_0-T_{0'}-T_r)$$

If the expression in (11) is subtracted from the expression in (6);

(12) $\qquad \varphi = 4\omega_1(T_0+T_{0'}+T_r)$

Expression 12 means that if the +1-kc. VF reading is subtracted from the −1-kc. VF reading, the phase shift value remaining is a function of $\omega_1$, the range signal frequency, the time delays between the antenna and duplexer inputs in both master and slave stations, and finally, the distance actually traveled by $\omega_1$ between slave and master stations. All other terms, embodying circuit and the 70-kc. link phase delays, are thus cancelled out by this subtraction.

Consider now the operation of the system when any of the other range channel signals are employed. In particular, assume that $\omega_2$ represents the frequency difference between $\omega_1$ of 10.000 mc. and any of the other channel range frequencies. Thus, as will be appreciated, $\omega_2$ will take values of 1 mc., 100 kc., and 10 kc. for the respective F, C and VC channels. Thus, following the Case I derivation, assume the slave station switch 90 will again be thrown to its −1-kc. position.

*Case III.*—Under the foregoing assumptions, the master station transmitted range signal becomes $(\omega_1-\omega_2)$ and the slave signal $(\omega_1-\omega_2-\omega_0)$.

(13) Signals present at point A;

$$(\omega_1-\omega_2)t \text{ and } (\omega_1-\omega_2-\omega_0)(t-T_{d_1}-T_0-T_{0'}-T_r)$$

(14) Signals present at point E;

$$\omega_0(t-T_{d_1}-T_0-T_{0'}-T_r-T_3)+ \\ (\omega_1-\omega_2)(T_{d_1}+T_0+T_{0'}-T_r)$$

(15) The signals present at point B;

$$(\omega_1-\omega_2)(t-T_0-T_{0'}-T_r) \text{ and } (\omega_1-\omega_2-\omega_0)(t-T_{d_1})$$

(16) The signals present at point C;

$$\omega_0(t-T_{d_1}-T_1)+(\omega_1-\omega_2)(T_{d_1}-T_0-T_{0'}-T_r)$$

(17) The signals present at point D;

$$\omega_0(t-T_{d_1}-T_1-T_2)+(\omega_1-\omega_2)(T_{d_1}-T_0-T_{0'}-T_r)$$

(18) The phase measurement indicated by the readout operation, or the difference between the point D and E signals:

$$\omega_0(t+T_2-T_0-T_{0'}-T_r-T_3)+2(\omega_1-\omega_2)(T_0+T_{0'}+T_r)$$

This reading, if subtracted from expression 11, representing the Very Fine channel phase measurement made with the +1-kc. slave return gives:

(19) $\qquad \varphi = 2\omega_2(T_0+T_{0'}+T_r)$

Expression 19 means that if each of the remaining channel readings, made with switch 90 in the slave at its −1-kc. position, is subtracted from the VF reading made with switch 90 in the slave in its +1-kc. position, the resulting range information acquired is based on the phase shift incurred in $\omega_2$, the difference in frequency between it and the VF channel signal. Accordingly, only a single +1-kc. reading need be taken on the VF channel setting.

Continuing the present description of the necessary data reduction steps which must be performed in order to acquire actual distance from the series of readings taken, consider now the manner of resolving the inherent ambiguities in the VF through C readings by the final, unambiguous VC reading.

The procedure involved in this particular data reduction step may be best understood by taking a time delay example and showing the corresponding set of channel readings thus obtained. Assume first of all, that the distance measured corresponds to an exact 10-microsecond time delay, after the first step of subtracting each reading from the +1-kc. VF reading as described above. If each channel reading is made to an absolute accuracy, which will not, in reality, be the case, the various channel readings will be as found in the below table:

*Delay*

| Sec. | $10^{-5}$ | $10^{-6}$ | $10^{-7}$ | $10^{-8}$ | $10^{-9}$ | $10^{-10}$ |
|---|---|---|---|---|---|---|
| 10 mc. (0.1 μsec.) readout | | | | 0 | 0 | 0 |
| 1 mc. (1 μsec.) readout | | | 0 | 0 | 0 | |
| 100 kc. (10 μsec.) readout | | 0 | 0 | 0 | | |
| 10 kc. (100 μsec.) readout | 1 | 0 | 0 | | | |
| | 1 | 0 | 0 | 0 | 0 | 0 |

Note.—$100{,}000 \times 10^{-10}$ sec. = 10 μsec.

In the table, the VF or 10-mc. range information, as noted earlier, is ambiguous since its wavelength is approximately 50 feet in length and hence will repeat itself at 50 foot intervals, or every 0.1 microsecond. Since a dial, of the type associated with the dial indicator, can normally be read to a resolution of about one part per thousand, the phase shift in time, of the 0.1 microsecond wavelength VF signal can be read to a resolution of 0.1 millimicrosecond, or $10^{-10}$ sec., the least significant digit channel in the table. The series of remaining channel measurements, since the wavelengths of their range signals progressively increase by factors of ten, give correspondingly longer time delay measurements. Since, as specified above, a 10-microsecond example is shown, of assumed perfect accuracy, a "1" will appear in the first column, corresponding to the 10-kc. or 100-microsecond per cycle channel reading, with all other readings being zero.

Now, the readings given to absolute accuracy by example in the table will not, in general, be obtained since the frequency accuracies to which the progressively longer wavelength range signals provided by the master station are relaxed, primarily in order to simplify and lighten the system equipment, and correspondingly reduce its cost. This frequency tolerance relaxation will, quite naturally, introduce errors in the lower frequency channel readings, and one function required of the data reduction process is to resolve these reading ambiguities while simultaneously arranging the data so that an over-all phase shift figure is obtained which eliminates all reading inaccuracies due to the relaxed frequency tolerances.

Again, assume for the purposes of explanation, a set of channel readings, all having errors except the VF channel whose information, as will be appreciated, must provide the ultimate system accuracy and, to this end, is controlled by the highly stable and accurate 10-megacycle reference oscillator 60. For continuing the example, the previous assumption of an actual time delay of 10 microseconds is again employed, but no channel reading is assumed more inaccurate than 5% of its full scale value or, more precisely, is no more inaccurate than 49 parts per thousand, or 4.9%.

*Delay*

| Sec. | $10^{-5}$ | $10^{-6}$ | $10^{-7}$ | $10^{-8}$ | $10^{-9}$ | $10^{-10}$ |
|---|---|---|---|---|---|---|
| VF or 10-mc. reading | | | | 0 | 0 | 0 |
| F or 1-mc. reading | | | 0 | 1 | 2 | |
| C or 100-kc. reading | | 9 | 5 | 1 | | |
| VC or 10-kc. reading | 1 | 1 | 0 | | | |

The first step is to correct the 1-mc. reading in accordance with the assumed accurate 10-mc. reading. This is readily accomplished since the overlapping digits should be identical. Consequently:

| 10-mc. reading | x | x | x | 0 | 0 | 0 |
|---|---|---|---|---|---|---|
| 1-mc. reading | x | x | 0 | 1 | 2 | |
| Corrected 1-mc. reading | x | x | 0 | 0 | 0 | 0 |

It will be observed that the overlapping digits could be made similar by either subtracting 12 from or adding 88 to the 1-mc. reading. The number 12 was subtracted since, as stated above, the error was assumed less than 50 parts of full scale. In the same way, the 100-kc. reading may be corrected by the previously corrected 1-mc. reading:

| 1-mc. corrected reading | x | x | 0 | 0 | 0 | 0 |
|---|---|---|---|---|---|---|
| 100-kc. reading | x | 9 | 5 | 1 | | |
| 100-kc. corrected reading | x | 0 | 0 | 0 | 0 | 0 |

Here, also, either 49 could have been added or 51 subtracted, but, following the stated rule, 49 was added. The normal carry-over to the next more significant digit resulting from the addition is ignored since the 100-kc. reading is ambiguous in that region.

Finally, the corrected 100-kc. reading is employed to correct the 10-kc. reading:

| Corrected 100-kc. reading | x | 0 | 0 | 0 | 0 | 0 |
|---|---|---|---|---|---|---|
| 10-kc. reading | 1 | 1 | 0 | 0 | 0 | 0 |
| Measured time delay, μseconds | 1 | 0 | 0 | 0 | 0 | 0 |

As is clear from the above example, ambiguities can be readily resolved if each of the lower range readings is accurate to within 49 parts of its full scale value, assuming it can be read to a resolution of one part per thousand. To accomplish this, the 1-mc. or 1-microsecond reading must be held to an accuracy of 49 millimicroseconds, the 100-kc. or 10-microsecond reading to .49 microsecond, and the 10-kc. or 100-microsecond reading to 4.9 microseconds. These accuracies, in turn, correspond to respective signal frequency accuracies of 1 part in 49,000 for the 1-mc. signal, 1-part in 4,900 for the 100-kc. signal, and 1 part in 490 for the 10-kc. signal. These successively more relaxed accuracy requirements explain the use of non-temperature-compensated crystals in the range signal generator unit for producing the 1-mc. and 100-kc. signals and the frequency discriminator for maintaining the VC signal at 10 kc.

The next step involved in converting a set of range readings, expressed in transit time, into corresponding distance information requires correcting the ambiguity resolved reading for the refractive index of air. This correction is necessary since time and distance are related by the velocity of light in a vacuum. Without pursuing this point in detail, several formulas are given in the literature for correcting wave transmission based on the refractive index of air. In general, the formulas require values for the atmospheric pressure, vapor pressure, and the temperature. Accordingly, these three measurements should be made at the time of taking the other readings. Their values may then be appropriately inserted in the particular refraction index formula used and the ambiguity resolved distance reading corrected on the basis of this calculation. Also, as will be appreciated, the velocity of light value, as needed to convert the corrected transit time into distance, may be acquired from any one of a number of reference or text books and, preferably, the most recently established, recognized value should be the one employed. Also, since the system according to the present invention measures slope distance or slant range, that is, the direct line distance between master and slave stations, altimeter readings should be taken at both the stations and the readings corrected for barometric pressure.

Another factor which may produce reasonably significant errors in the distance measurement is that of multipath propagation. In particular, these multipath errors are caused by a portion of transmitted signal bouncing or reflecting off of intervening objects and entering the receiving antenna with a slightly increased path length over that portion of the signal energy traveling directly between the antennas. This effect will result in an intermingling of the two signals having a slightly displaced phase relationship, and a resulting phase error.

It may be shown mathematically that the magnitude of these multipath errors is dependent on the carrier frequency and that such an error will vary cyclically about the true reading as the carrier signal frequency is correspondingly varied. Accordingly, in order to eliminate this type of error, a series of readings may be taken at each master-slave location with the carrier signal of the master being varied in discrete frequency steps. For example, a number of steps, displaced by 30 mc. from each other, above and below its normal 9-kmc. range may be taken by mechanically tuning the klystron cavity, the tuning arm being indicated schematically on klystron 30 in FIGURE 1. The mean value of the readings obtained will represent the average of the cyclical differences obtained through the carrier frequency variation and this final reading then may be taken to be the correct distance between the two units.

The range reading accuracy may be improved still further and this system capability is due entirely to the convertibility characteristics of the basic master-slave unit. This improvement in accuracy may be obtained, after taking one series of readings, by reversing the functions of the two units and repeating the series of readings. Averaging the two distances thus obtained will serve to average the accuracies and stability of the reference oscillators in the master and slave units.

As mentioned above, one factor determining the accuracy of a set of readings is that the circuit introduced phase delays remain constant during the time required to take the readings. The stability of some of these phase delays may be observed in the slave station by initially adjusting its dial indicator to where null meter 52 indicates null. This, of course, will not affect the signal retransmission to the master station and the reading obtained at the dial indicator will comprise only the phase difference incurred between two of the signals passing through the slave station circuitry, and will contain no distance information. Now, by observation of the null meter during the taking of the series of range readings will give an indication of circuit phase stability. In other words, if the null meter reading remains constant, then no drift in the circuit introduced phase shifts in the slave station has occurred, hence giving an assurance of the reading's reliabiltiy. On the other hand, if the null meter reading should vary, then the assumption of constant circuit phase delay is erroneous and the readings should be repeated until circuit stability is indicated.

As will be appreciated by those skilled in the art, the particular carrier signal frequencies of the master and slave stations, and the series of range signal frequencies chosen for modulation on the master carrier signal is a matter of engineering expedience and other range signal frequencies, and other carrier signal frequencies may be just as readily employed without involving invention. In the same way, the 1-kc. frequency, chosen as the frequency difference between the master and slave range signals may be changed, as will be appreciated, without involving invention.

It will also be apparent that in the entire system shown and described, numerous modifications and changes may be incorporated in the particular arrangement of circuits for accomplishing the over-all functions set forth without involving invention. It is also apparent that each of the circuits, as shown in block diagrammatic form, may take any one of many well-known recognized forms, as known in the art and shown in the numerous handbooks, technical books, etc., without the employment of invention.

It will be appreciated, of course, by those skilled in the art, that the foregoing disclosure relates only to a detailed preferred embodiment of the invention whose spirit and scope of the invention is set forth in the appended claims.

What is claimed is:

1. An electronic surveying system for obtaining distance information between first and second points, said system comprising: first transmitting means at said first point for producing and transmitting a first carrier signal of a first carrier frequency frequency modulated by a range signal of a first range frequency; a slave electronic unit positioned at said second point, said slave unit including, first receiving means for receiving said first signal, means for producing a second carrier signal of a second carrier frequency modulated by a range signal of a second range frequency, means for mixing the modulated second carrier signal produced by the last-named means with the signal received by said first receiving means, the signal resulting from said mixing including an amplitude-modulated signal having a frequency equal to the difference between said first and second range signal frequencies, means for detecting the amplitude-modulated signal appearing in the mixed signal, means for producing a third signal of a third frequency, means for modulating the detected amplitude-modulated signal on said third signal, means for modulating the modulated third signal on said second carrier signal, and means for transmitting the modulated second carrier signal; second receiving means at said first point for receiving the signal transmitted by said slave electronic unit; electronic mixing means for mixing the signal produced by said first transmitting means with the signal received by said second receiving means whereby said mixed signal includes an amplitude-modulated signal whose frequency corresponds to the amplitude-modulated signal appearing in said slave unit; means for demodulating the third signal from said received signal, the phase difference between the demodulated third signal and said amplitude-modulated signal relating to the distance between said first and second points; and phase measuring means for measuring the phase difference between the last-named pair of signals whereby information relating to the distance between said first and second points as obtained.

2. The electronic surveying system according to claim 1, wherein said phase measuring means includes first means responsive to a pair of applied input signals of identical phase shifts for indicating said equal phase shift, means for applying one of the last-named pair of signals to said first means, manually operable phase shifting means operable to shift the phase of an applied signal, and means for applying the other of said last-named pair of signals through said phase shifting means to said first means whereby an equal phase shift is indicated by said first means whenever the manually operable phase shifting means is operated to shift the phase of its applied signal by an amount equal to the phase difference between said last-named pair of signals.

3. The electronic surveying system according to claim 2 wherein said first means includes a discriminator having an output terminal and a null meter connected to said output terminal, said discriminator producing a zero valued output signal as indicated by said null meter when the last-named pair of signals applied to said discriminator are of equal phase, and said manually operable phase shifting means includes a linear phase shifting resolver whereby equal increments of resolver rotation cause equal amounts of phase shift in the other of said pair of last-named signals.

4. The electronic surveying system according to claim 3 including, in addition, a dial indicator coupled to said resolver whereby the phase difference between said last-named pair of signals may be indicated.

5. The electronic surveying system according to claim 1 including, in addition, actuable means responsive when actuated for modulating the carrrier signal produced by said first transmitting means with a fourth signal within the audio frequency range, and demodulating means at said second point for demodulating said fourth signal from said carrier signal whereby information in the audio frequency range may be transmitted from said first point to said second point.

6. The electronic surveying system according to claim 5 including, in addition, actuable means responsive when actuated for modulating the second carrier signal with a fifth signal within the audio frequency range, and second demodulating means at said first point for demodulating said fifth signal from said modulated second carrier signal whereby information in the audio frequency range may be transmitted from said second to said first point.

7. An electronic distance-measuring system comprising: first and second identical electronic units, each of said units including selectively operable switch means having first and second switch positions and operable in response to the first switch position for including first means for transmitting a first carrier signal of a first carrier frequency modulated by a first range signal of a first range frequency, and second means for mixing the modulated carrier signal transmitted by said first means with a received carrier signal having a second carrier frequency modulated by a second range signal of a second range frequency differing from the first range frequency by a predetermined amount for producing a difference signal of a frequency corresponding to said predetermined amount, said difference signal including phase information of the distance between said first and second electronic units, each of said units being operable in response to the second switch position of its associated selectively operable switch means for including third means responsive to the receipt of a carrier signal of the first carrier frequency modulated by a range signal of said first range frequency for transmitting a carrier signal of a second carrier frequency modulated by a range signal of the second range frequency whereby information of the distance between said first and second electronic units may be obtained when the selectively operable switch means in said first and second units are in different switch positions.

8. A system for measuring the distance between a pair of stations, comprising: a pair of portable electronic units, each of said units including means for transmitting a respective carrier signal; means in one of said units responsive to the carrier signal transmitted by the other unit for maintaining the frequency of its carrier signal at a fixed frequency therefrom; means in each unit for generating a respective modulating signal; means in each unit for modulating its respective modulating signal on its associated carrier signal; means in one unit responsive to the modulating signal received from the other unit for maintaining the frequency of its modulating signal at a fixed frequency therefrom; means in each unit for developing a first signal whose frequency corresponds to the difference in frequency between said modulating signals; means in one unit for modulating said first signal on its respective carrier signal whereby said first signal is transmitted to said other unit; and means in one of said units responsive to the phase differences between the first signal generated in both units for indicating the phase difference therebetween, said indication representing the distance between the pair of stations.

9. In combination: first means for transmitting a first carrier signal of a first carrier frequency and modulated by a first modulating signal of a first modulation frequency; second means responsive to the receipt of the modulated carrier signal transmitted by said first means for producing a second carrier signal of a second carrier frequency modulated by a second modulating signal of a second modulation frequency, said second means including electronic servoing means for maintaining said second carrier frequency at a predetermined difference from said first carrier frequency; third means associated with said second means for mixing the modulated signals transmitted by said first and second means to produce a first difference signal whose frequency is equal to the difference between said first and second modulation frequencies; fourth means for modulating said second carrier signal with the phase information contained in said first difference signal; fifth means associated with said first means for mixing the modulated carrier signals transmitted by said first and second means to produce a second difference signal of a frequency corresponding to the difference between said first and second modulation frequencies, the difference in the phase information contained in said first and second difference signals representing the distance between the locations of said first and second means; and sixth means for indicating the difference in the phase information contained in said first and second difference frequencies.

10. In combination: first means for transmitting a first carrier signal of a first carrier frequency and modulated by a first modulating signal of a first modulation frequency; second means responsive to the receipt of the modulated carrier signal transmitted by said first means for producing a second carrier signal of a second carrier frequency modulated by a second modulating signal of a second modulation frequency, said second means including electronic servoing means for maintaining said second modulation frequency at a predetermined difference from said first modulation frequency and the phase differences between said first and second modulating signals at a predetermined amount; third means associated with said second means for mixing the modulated signals transmitted by said first and second means to produce a first difference signal whose frequency is equal to the difference between said first and second modulation frequencies; fourth means for modulating said second carrier signal with the phase information contained in said difference signal; fifth means associated with said first means for mixing the modulated carrier signals transmitted by said first and second means to produce a second difference signal of a frequency corresponding to the difference between said first and second modulation frequencies, the difference in the phase information contained in said first and second difference signals representing the distance between the locations of said first and second means; and sixth means for indicating the difference in the phase information contained in said first and second difference frequencies.

11. In combination: a pair of portable transmitter-receiver stations; radiating means at each station for radiating signals toward and receiving signals from the other station; means at each station for producing a carrier signal of a respective frequency for radiation by its associated radiating means; means at each station for producing a series of modulation signals, each corresponding pair of modulation signals in the two series differing by the same predetermined frequency; selection means at each station for frequency modulating its associated carrier signal with each modulation signal in the series whereby corresponding pairs of modulation signals may be simultaneously modulated on the two carrier signals; means at each station for mixing the modulated carrier signal being radiated therefrom with the modulated carrier signal received from the other station to develop an intermediate frequency signal of the difference frequency of the carrier signals amplitude-modulated by a continuous wave signal of said predetermined frequency; means at one of said stations for generating a subcarrier signal and frequency modulating said subcarrier signal on its associated carrier signal; means at said one station for detecting said continuous wave signal and additionally frequency modulating said detected continuous wave signal on said generated subcarrier signal; means at the other station for extracting the continuous wave signal from the modulated subcarrier signal and detecting the continuous wave signal amplitude-modulated on its intermediate frequency signal; and phase comparing means at said other station for comparing the phases of the extracted continuous wave signal and the detected continuous wave signal.

12. The combination defined in claim 11, further including servoing means at one of said stations for adjusting the frequency of the associated carrier signal to maintain the frequency difference between the carrier signals constant.

13. The combination defined in claim 11, wherein said phase comparing means includes a visual indicator which provides an output indication representing information on the distance between the two stations.

14. The combination defined in claim 11, further including means at one station for adjusting the frequency of each of its modulation signals to maintain a constant difference between it and the frequency of the other corresponding modulation signal.

15. In combination: a pair of spaced sources of carrier signals of predetermined frequencies each frequency modulated by a modulation signal of predetermined frequency, the frequencies of said carrier signals being different and the frequencies of said modulation signals being different from each other and either of the carrier signals; means for frequency modulating one carrier signal with a subcarrier signal different in frequency from the frequencies of any of said carrier signals and modulation signals; means for frequency modulating the subcarrier signal with a sinusoidal signal of the difference frequency of the modulation signals; means for transmitting the carrier signal modulated by the subcarrier signal to the other source; means at said other source for mixing both carrier signals and extracting the subcarrier signal and a sinusoidal signal of a frequency equal to the difference between the frequencies of said modulation signals; means at said other source for extracting the sinusoidal signal from the subcarrier signal; and means at said other source for comparing the phases of said extracted sinusoidal signals to thereby derive distance information.

16. In combination: a pair of portable transmitter-receiver stations; radiating means at each station for radiating signals toward and receiving signals from the other station; means at each station for producing a carrier signal of a respective frequency for radiation by its associated radiating means; means at each station for producing a series of modulation signals, each corresponding pair of modulation signals in the two series differing by the same predetermined frequency; selection means at each station for frequency modulating its associated carrier signal with each modulation signal in the series whereby corresponding pairs of modulation signals may be simultaneously modulated on the two carrier signals; means at each station for mixing the modulated carrier signal being radiated therefrom with the modulated carrier signal received from the other station to develop an intermediate frequency signal of the difference frequency of the carrier signals amplitude-modulated by a continuous wave signal of said predetermined frequency; first selectable operable means at each station operable when selected for generating a subcarrier signal and frequency modulating said subcarrier signal on its associated carrier signal; second selectable operable means at each station operable when selected for detecting said continuous wave signal and additionally frequency modulating said detected continuous wave signal on said generated subcarrier signal; third selectable operable means at each station operable when selected for extracting the continuous wave signal from the modulated subcarrier signal and detecting the continuous wave signal amplitude-modulated on its intermediate frequency signal; fourth selectable operable means at each station operable when selected for comparing the phases of the extracted continuous wave signal and the detected continuous wave signal, the phase difference between the compared extracted continuous wave and the detected continuous wave signals representing distance information between said pair of stations; and selection means at each station for selecting either said first and second selectable operable means or said third and fourth selectable operable means whereby distance information between said pair of stations may be derived at either of said stations.

17. An electronic surveying system for determining the distance between first and second points, said system comprising: first transmitting means at said first point for transmitting a first carrier signal; range signal generating means selectively operable for producing a series of ranging signals having a series of increasingly effective longer wavelengths, respectively; first modulating means associated with said first transmitting means for successively modulating said series of ranging signals on said first carrier signal; receiving means at said second point for receiving said first carrier signal; second transmitting means at said second point responsive to said first carrier signal received by said receiving means for retransmitting a second carrier signal of a different frequency from said first carrier signal; second modulating signal means associated with said second transmitting means and responsive to the series of frequencies of said series of ranging signals as modulated on said first carrier signal for modulating the second carrier signal produced by said second transmitting means at a predetermined frequency difference from each of said series of received ranging signals; means located at said second point for generating a third signal; means located at said second point for modulating a fourth signal corresponding in frequency and phase to said predetermined difference frequency on said third signal; means located at said second point for modulating said modulated third signal on said second carrier signal; and additional receiving means at said first point and responsive to the signals transmitted by said first and second transmitting means for mixing said signals to produce a signal corresponding in frequency to said predetermined difference frequency, the phase difference between the last-named signal and said fourth signal relating to the distance between said first and second points.

18. The electronic surveying system according to claim 17 including in addition, demodulating means at said first point for demodulating the received third signal to produce said fourth signal, and means at said first point for indicating the phase differences between said fourth signal and said predetermined difference frequency signal, for said series of ranging signals whereby the unambiguous distance between said first and second points may be computed from said series of indications made by said series of ranging signals.

19. The electronic surveying system according to claim 18 wherein the last-named means includes a discriminator having a pair of input terminals and an output terminal and responsive to signals of equal frequency and phase applied to its input terminals for producing a zero valued signal on its output terminal, a manually operable phase shifter, means for applying one of the two last-named signals through the phase shifter to one input terminal of said discriminator, means for applying the other of said last-named pair of signals to the other input terminal of said discriminator, and null detecting means connected to the output terminal of said discriminator whereby a null indication is obtained when the manually operable phase shifter is rotated to equal the phase shift difference between said pair of signals.

20. The electronic surveying system according to claim 19 wherein said range signal generating means includes means for generating a reference frequency signal, a series of signal generating means generating a series of signals differing from the frequency of said reference frequency signal by amounts equal to said series of ranging signal frequencies, and selectively operable means for selectively comparing one of the signals generated by said series of signal generating means with said reference frequency signal to derive a corresponding ranging signal.

References Cited in the file of this patent

UNITED STATES PATENTS

| | | |
|---|---|---|
| 2,248,727 | Strobel | July 8, 1941 |
| 2,591,698 | Henry | Apr. 8, 1952 |
| 2,907,999 | Wadley | Oct. 6, 1959 |